W. E. MAYER.
AUTOMATIC ANTIFROST STOVE.
APPLICATION FILED SEPT. 25, 1914.

1,128,892.

Patented Feb. 16, 1915.

Witnesses
Fenton N Belt
J. N. Sherwood

Inventor
William E. Mayer
By Franklin N. Haug
Attorney

W. E. MAYER.
AUTOMATIC ANTIFROST STOVE.
APPLICATION FILED SEPT. 25, 1914.

1,128,892.

Patented Feb. 16, 1915.

Witnesses
Fenton S. Belt
J. W. Sherwood

Inventor
William E. Mayer
Franklin D. Hough
Attorney

UNITED STATES PATENT OFFICE.

WILLIAM E. MAYER, OF CINCINNATI, OHIO, ASSIGNOR TO THE ANTI-FROST STOVE COMPANY, OF CINCINNATI, OHIO, A CORPORATION.

AUTOMATIC ANTIFROST-STOVE.

1,128,892.   Specification of Letters Patent.   Patented Feb. 16, 1915.

Application filed September 25, 1914. Serial No. 863,558.

*To all whom it may concern:*

Be it known that I, WILLIAM E. MAYER, a citizen of the United States, residing at Cincinnati, in the county of Hamilton and State of Ohio, have invented certain new and useful Improvements in Automatic Antifrost-Stoves; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in portable automatic antifrost stoves, designed especially as a preventative against the killing effects of frost upon fruit buds when in blossom or setting fruit.

More specifically, the invention consists in the provision of a receptacle adapted to contain oil which is automatically ignited through the medium of a wick which, when being severed by burning, is adapted to release a lid to the receptacle and ignite the oil within.

The present invention comprises a simple and efficient apparatus of this nature, having various details of construction, combinations and arrangements of parts which will be hereinafter fully described, shown in the accompanying drawings and then specifically defined in the appended claims.

My invention is illustrated in the accompanying drawings, in which—

Figure 1:
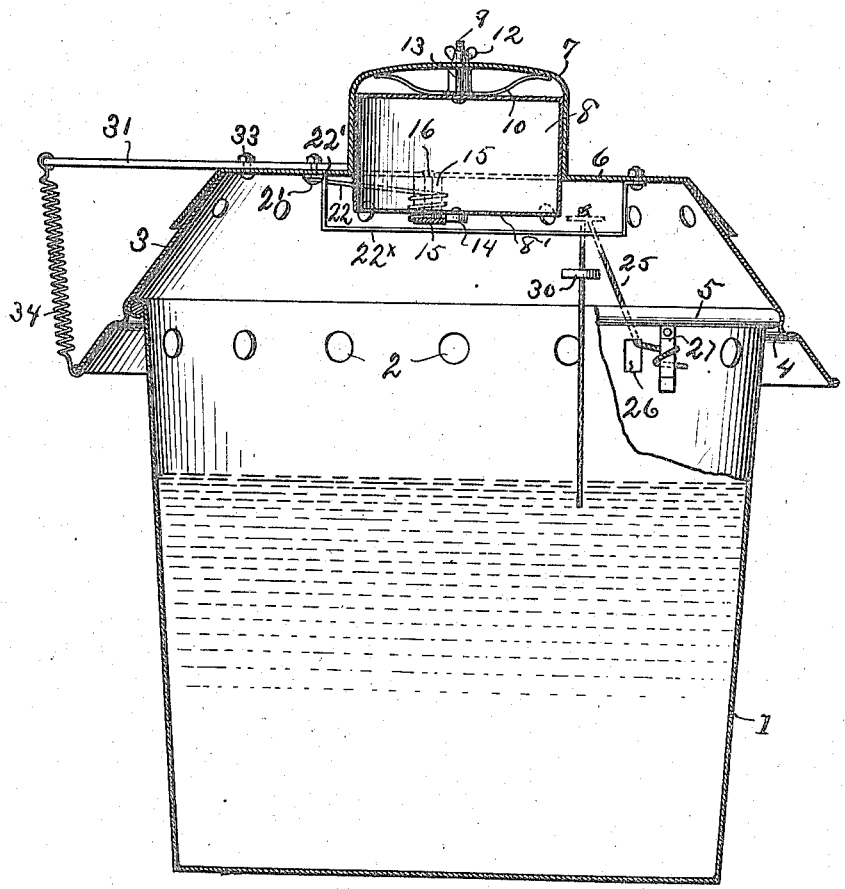
Figure 4:
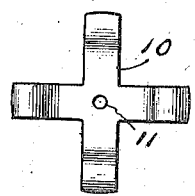
Figure 2:
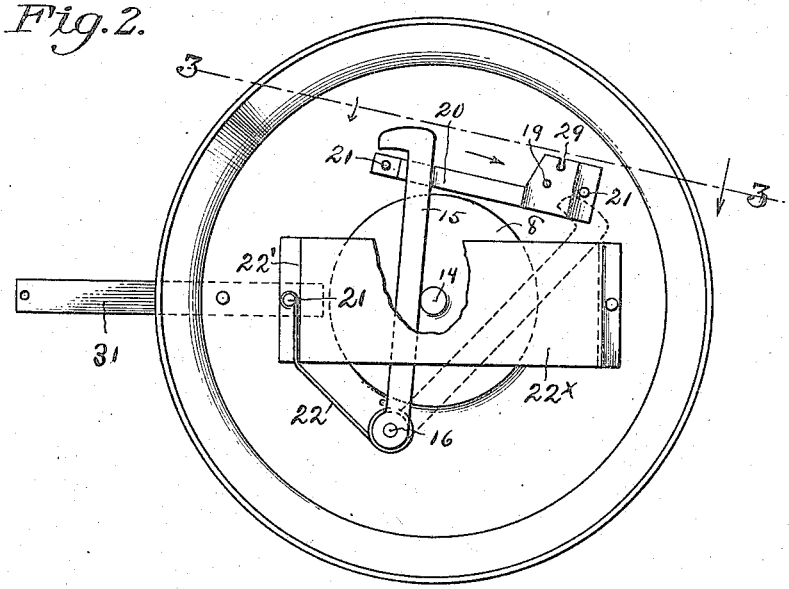
Figure 3:
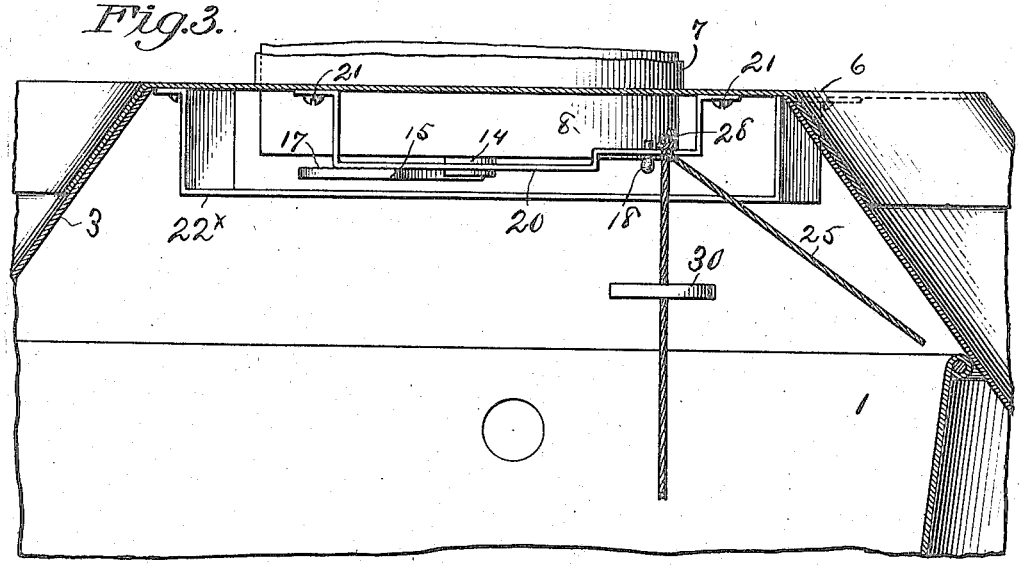

Figure 1 is a central vertical sectional view through the device. Fig. 2 is a bottom plan view of the removable lid. Fig. 3 is a sectional view on line 3—3 of Fig. 2, and Fig. 4 is a detail view of a part of the invention.

Reference now being had to the details of the drawings by numeral, 1 designates a bowl or receptacle adapted to contain the oil and is provided with a series of apertures 2 formed in the wall thereof near its upper end for the transmission of air, and 3 is a hood with an annular beading 4 formed in the flaring wall thereof and rests upon the beading 5 formed at the upper marginal edge of the receptacle. A cover, designated by numeral 6, has a flaring flange and rests loosely upon the upper open end of the hood and has a dome 7 adapted to contain a cylindrical airtight drum 8, the lower wall of which forms a flexible diaphragm 8'. Said shell is relatively adjustable within the dome and is suspended by means of an adjusting screw 9 which passes through an aperture in the dome. Said screw passes through an aperture in the top of the drum, and a spring 10, a detail of which is shown in Fig. 4 of the drawings, is provided with a central aperture 11 for the reception of said screw and the fingers of the spring bear yieldingly against the under surface of the dome. A winged nut 12 is fitted to the threaded end of the screw and bears against the surface of the dome and serves as means whereby the tension of the spring 10 may be regulated accordingly as it may be desired to have the diaphragm operate automatically at varying degrees of temperature. A lug 14 projects centrally from the under surface of the diaphragm and is normally in the path of a swinging match igniting member 15 which is mounted upon a pivot 16, the under surface of said member 15 having a roughened or rasping surface 17 upon the under surface of its angled end 17', which rasping surface is adapted to contact with the head 18 of a match inserted in an aperture 19 in the bracket member 20 which is fastened by means of screws 21 to the under surface of the lid 6. A spring 22 is secured to and winds about the pivotal end of the member 15 and extends about a shoulder 22' and the end of the spring is secured to a screw 21 which holds the bracket member 22ˣ to the under surface of the lid, the purpose of said spring 22, when under tension and when the member is released, being to cause the member to be thrown from the position shown in solid lines in Fig. 2 to that in dotted lines and which movement will cause the match to ignite by contact of the rasping surface thereon with the head of the match.

A wick, designated by numeral 25, passes through an aperture 26 in the wall of the receptacle 1 and is fastened to a strap 27 and has a knotted portion 28 engaging a notch or recess 29 formed in the edge of the bracket member 20, while another portion of the wick which depends from the bracket is adapted to extend into the oil of the receptacle and is provided with a float 30.

A bar 31, shown clearly in Fig. 1 of the drawings, is secured by means of the bolts 33 to the lid 6 and a coiled spring 34 is fastened at one end to the lower edge of the hood and its other end to the outer end of the bar 31 and is normally under tension, the purpose of said spring being to cause the lid to be thrown from the top of the hood when the lid is released by the contraction of the air within the drum, sufficiently to cause the diaphragm to withdraw the lug 14 out of the path of the spring-pressed member 15.

The operation of my improved apparatus will be as follows:—A supply of oil being placed within the receptacle and the parts adjusted in the manner shown in Fig. 1 of the drawings, the tension of the spring bearing against the drum, one end of which forms a diaphragm, being adjusted so that, when the temperature lowers to a predetermined degree, approximating the freezing point, the contraction of the diaphragm incident to the temperature approaching the freezing point will cause the air within the drum to contract slightly and draw the lug 14 out of the path of the match igniting member 15, which will allow the rasping surface upon the under face thereof to strike against the head of the match and ignite the wick adjacent thereto, which wick, by reason of its hanging in the oil, will become saturated with the latter and ignite readily. As the wick is severed by being burned, the float and the wick will fall and ignite the oil. Simultaneously with the burning of the wick, the spring 34, which is normally held under tension by the wick, will cause the lid to be thrown over the receptacle and allow the smoke and the products of combustion to escape from the receptacle as the oil burns.

By the provision of a series of anti-frost receptacles embodying the features of my invention, scattered at intervals about an orchard, it will be noted that an efficient means will be provided for preventing the temperature about the trees from approaching the freezing point which would have killing effects upon the fruit buds when in blossom or setting fruit, the various stoves being automatically lighted when the temperature approaches the danger point.

While I have shown a particular form of device embodying the principle of my invention, it will be understood that the detailed construction of the anti-frost stove may be varied in different ways, if desired, without departing from the spirit of the invention.

What I claim to be new is:—

1. An automatic anti-frost stove comprising an oil containing receptacle with a spring-actuated removable lid, a wick secured at one end to said receptacle and fastened to the lid, a float upon a depending portion of the wick, a spring-pressed match igniting member, and thermally-actuated means for holding and releasing said member to allow the same to ignite a match head positioned adjacent to said wick.

2. An automatic anti-frost stove comprising an oil containing receptacle, a removable spring-pressed lid over the receptacle, a wick attaching the lid to the receptacle, a pivotal spring-pressed match igniting member, a thermally-actuated diaphragm upon the lid provided with a projection normally holding said member under tension of the spring and adapted to release the same when the diaphragm is actuated by the lowering of the temperature to a predetermined degree, thus allowing said member to ignite a match head positioned adjacent to said wick.

3. An automatic anti-frost stove comprising an oil containing receptacle, a removable lid, an arm projecting therefrom, a spring connecting the latter with the receptacle, a wick fastening the lid to said receptacle and holding said spring under tension, a pivoted spring-pressed match igniting member, a thermally-actuated diaphragm upon the lid provided with a projection normally holding said member under tension of the spring and adapted to release the same when the diaphragm is actuated by the lowering of the temperature to a predetermined degree, thus allowing said member to ignite a match head positioned adjacent to said wick.

4. An automatic anti-frost stove comprising an oil containing receptacle, a removable lid, an arm projecting therefrom, a spring connecting the latter with the receptacle, a wick fastening the lid to said receptacle and holding said spring under tension, a pivotal spring-pressed match igniting member, an adjustable thermally-actuated diaphragm upon the lid provided with a projection normally holding said member under tension of the spring and adapted to release the same when the diaphragm is actuated by the lowering of the temperature to a predetermined degree, thus allowing said member to ignite a match head positioned adjacent to said wick.

5. An automatic anti-frost stove comprising an oil containing receptacle, a removable spring-pressed lid having a dome thereon, a drum adjustable within said dome, the lower face of which drum forms a thermally-actuated diaphragm with a projection upon the under surface thereof, a wick connecting the lid to the receptacle and normally holding the spring attached to the lid under tension, a pivotal match igniting member, a spring secured to said member and held under tension by said projection, the latter being adapted to be thrown out of the path of said member by the thermal action of the diaphragm to allow the member to ignite a match head positioned adjacent to said wick.

6. An automatic anti-frost stove comprising an oil containing receptacle, a hood upon said receptacle, a removable lid upon the hood, an arm projecting from the lid, a spring fastened at one end to said arm and the other end to the hood, a dome upon the lid, a drum within the dome, the lower surface of the drum serving as a thermally-actuated diaphragm and provided with a lug upon its under surface, a spring-pressed adjustable means for holding the drum within the dome, a wick connecting the lid to the receptacle, a match igniter pivotally mounted upon the lid, a spring fastened at one end to said member and the other end to the lid and held under tension by said lug upon the diaphragm, the latter being adapted to be acted upon by temperature at a predetermined degree to cause the lug to be thrown out of the path of said member, allowing the latter to swing with its rasping edge against the head of a match positioned adjacent to said wick.

7. An automatic anti-frost stove comprising an oil containing receptacle, a hood upon said receptacle, a removable spring-actuated lid resting upon said hood and provided with a dome, a drum mounted within the dome, the lower end of which forms a thermally-actuated diaphragm, a lug upon the under surface of the latter, a screw suspending the drum within the dome, a nut upon the screw, a spring interposed between the dome and the drum, a wick connecting the receptacle to the lid, a match igniting member pivotally mounted upon the lid, a spring secured to said member and held under tension by said lug, the latter being adapted to be thrown out of the path of the member by the thermal action of the diaphragm to allow the member to ignite a match head positioned adjacent to the wick.

8. An automatic anti-frost stove comprising an oil containing receptacle, a hood upon said receptacle, a removable spring-actuated lid resting upon said hood, a bracket member secured to the under surface of the lid and provided with an aperture for the reception of a match and having a notched edge, a wick fastened to the receptacle and having a portion thereof engaging said recess in the edge of the bracket member, a float upon a depending portion of the wick, a thermally-actuated diaphragm mounted upon the lid, a projection upon said diaphragm, a pivotal spring-actuated match igniting member mounted upon the lid, a spring secured to said member and held under tension by said projection, the latter being adapted to be thrown out of the path of the member at a predetermined degree of temperature to cause a match head positioned adjacent to the wick to be ignited.

In testimony whereof I hereunto affix my signature in presence of two witnesses.

WILLIAM E. MAYER.

Witnesses:
C. A. HEILKER,
P. N. SIMON.